US012711508B2

(12) United States Patent
Maiorana et al.

(10) Patent No.: US 12,711,508 B2
(45) Date of Patent: Aug. 18, 2026

(54) REAL-TIME FRAUD SESSION TERMINATION IN DIRECT PAY SYSTEM

(71) Applicant: Wells Fargo Bank, N.A., San Francisco, CA (US)

(72) Inventors: Nicola A. Maiorana, Charlotte, NC (US); Peter Rozovski, Concord, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 25 days.

(21) Appl. No.: 18/397,491

(22) Filed: Dec. 27, 2023

(65) Prior Publication Data

US 2025/0217807 A1 Jul. 3, 2025

(51) Int. Cl.
*G06Q 20/40* (2012.01)
*G06Q 20/10* (2012.01)
*G06Q 20/38* (2012.01)

(52) U.S. Cl.
CPC ....... *G06Q 20/4016* (2013.01); *G06Q 20/108* (2013.01); *G06Q 20/3821* (2013.01); *G06Q 2220/00* (2013.01)

(58) Field of Classification Search
None
See application file for complete search history.

(56) References Cited

U.S. PATENT DOCUMENTS 7,360,087 B2 4/2008 Joergensen et al.
7,406,594 B2 7/2008 Taruguchi
7,620,600 B2 11/2009 Patil et al.
7,917,941 B2 3/2011 Wallman
11,423,387 B2 8/2022 Somasundaram
11,503,068 B1 11/2022 Nguyen et al.
(Continued)

FOREIGN PATENT DOCUMENTS

WO 2005038649 4/2005
WO 2008150801 12/2008
WO WO-2008150801 A1 * 12/2008 ......... G06Q 20/3823

OTHER PUBLICATIONS

Gurbani, V. K., “Session Initiation Protocol: Service Residency and Resiliency”, Bell Labs Technical Journal 8(1), 83-94 (2003). (Year: 2003).*

*Primary Examiner* — Clay C Lee
(74) *Attorney, Agent, or Firm* — SCHWEGMAN LUNDBERG & WOESNNER, P.A.

(57) ABSTRACT

Examples are directed to systems and methods that block sessions established with an application when fraudulent has occurred at an endpoint associated with the application after establishment of the sessions. A plurality of sessions are established with the application. A first request via a first session of the plurality of sessions is received after session establishment. The first request requests access to the endpoint. A determination is made that the first request is an unauthorized attempt to access the endpoint. The first session is blocked such that a user associated with the first session cannot access the application using the first session. A second request via a second session of the plurality of sessions is received, the second request requesting access to the endpoint. The second session is then blocked such that a user associated with the second session cannot access the application using the second session.

18 Claims, 6 Drawing Sheets

(56) References Cited

U.S. PATENT DOCUMENTS

| | | | | |
|---|---|---|---|---|
| 2003/0097331 | A1* | 5/2003 | Cohen | G06Q 20/108 705/42 |
| 2004/0030926 | A1 | 2/2004 | Clark | |
| 2006/0021019 | A1* | 1/2006 | Hinton | H04L 63/0815 726/10 |
| 2010/0039956 | A1 | 2/2010 | Zheng | |
| 2015/0039510 | A1* | 2/2015 | Drury | G06Q 20/3829 705/64 |
| 2019/0139048 | A1* | 5/2019 | Senci | G06Q 20/12 |
| 2020/0045519 | A1* | 2/2020 | Raleigh | H04W 4/50 |
| 2021/0081947 | A1* | 3/2021 | Hockey | G06Q 20/4014 |
| 2024/0420144 | A1* | 12/2024 | Rozovski | G06Q 20/4016 |

* cited by examiner

REAL-TIME FRAUD SESSION TERMINATION IN DIRECT PAY SYSTEM

BACKGROUND

Business entities that regularly provide payments can use a direct pay application to remit these payments online. For example, a small business can use a direct pay application to regularly pay salaries, provide expense reimbursement, pay commissions, and pay third party vendors. The direct pay application can have direct access to a bank account(s) associated with the small business and facilitate withdrawal of funds from the bank account(s) without involvement from a user authorized to make withdrawals from the bank account(s) on behalf of the small business. Oftentimes, the amounts paid using a direct pay application can be thousands of dollars, such as when employee salaries or commissions are dispersed.

SUMMARY

The payment amounts and the regularity with which payments are remitted from the direct pay applications make direct pay applications a convenient target for fraudsters. Fraudsters can simultaneously establish multiple sessions with a direct pay application and directly withdraw funds from a bank account(s) associated with a small business during the multiple sessions with the direct pay application. After the multiple sessions have been established, when a determination is made that one of the sessions of the multiple sessions is associated with fraudster, the session is immediately shut down. However, the fraudster still has other sessions that are already open and can use one of the other sessions to continue withdrawing funds from the bank account(s). Limiting user to be able to open only one session conflicts with user needs to open multiple sessions to see different application screens at the same time.

Therefore, what is needed is a system and method that solves the problems associated with a fraudster withdrawing funds from a bank account(s) deemed as being subject to fraudulent activity using sessions already established with a direct pay application that accesses the bank account(s) before the fraud was detected.

Examples relate to a system and method that can prevent a fraudster from withdrawing funds from a bank account(s) that has been subject to fraudulent activity. A plurality of sessions associated with a fraudster may be established with a direct pay application that allows for withdrawal of funds from a bank account(s) associated with the direct pay application. The direct pay application can be associated with a fraud detection system—and a Concurrent Session Management (CCSM) client. The CCSM client can be associated with a CCSM manager which can access a database that can maintain a status of application accounts, such as the application service account associated with the direct pay application and application user accounts for application users for this customer.

The plurality of sessions can be established by a single fraudster or multiple fraudsters. After establishment of the plurality of sessions, the fraud detection manager can determine that a fraudster is attempting to commit fraudulent activity for bank account(s) via the direct pay application at a first session of the plurality of sessions. Upon detection, the first session is shut down. Moreover, the fraud detection system can flag the application user account at the database. The flag can indicate that fraudulent activity has occurred in the session, initiated by this application user account. Thus, any sessions attempting to withdrawn funds from the bank account(s) can also be blocked, including ones of the already established plurality of sessions.

When the first session is blocked, either the same fraudster or a different fraudster may attempt to withdraw funds from the bank account(s) via the direct pay application using a second session of the plurality of sessions that were established prior to the first session being blocked. The second session may send a request to the direct pay application. In response to receiving the request, the CCSM client contacts the CCSM manager. The CCSM manager can then receive KAFKA message from application accounts database that application user account was flagged as locked due to fraud attempt and block the second session. Therefore, even though the second session was already established with the direct pay application prior to the application user account associated with the direct pay application being flagged, the second session can also be blocked before a fraudster has the opportunity to withdraw funds using the direct pay application.

DETAILED DESCRIPTION

Examples relate to a system and method that can prevent a fraudster from withdrawing funds from a bank account(s) that has been subject to fraudulent activity. A plurality of sessions associated with a fraudster may be established with a direct pay application that allows for withdrawal of funds from a bank account(s) associated with given small business, enrolled into the direct pay application. The direct pay application can be associated with a fraud detection system and a CCSM client. The CCSM client can be associated with a CCSM manager which can access a application accounts database that can maintain a status of application user accounts and the application service account associated with the direct pay application and small business customer.

The plurality of sessions can be established by a single fraudster or multiple fraudsters. After establishment of the plurality of sessions, the fraud detection system can determine that a fraudster is attempting to commit fraudulent activity for a bank account(s) via the direct pay application at a first session of the plurality of sessions. Upon detection, the first session is shut down. Moreover, the fraud detection unit can flag the application user account at the application accounts database. The flag can indicate that fraudulent activity has occurred at the Application user account. Thus, any sessions attempting to withdrawn funds from the bank account(s) can also be blocked, including ones of the already established plurality of sessions.

When the first session is blocked, either the same fraudster or a different fraudster may attempt to withdraw funds from the bank account(s) via the direct pay application using a second session of the plurality of sessions that were established prior to the first session being blocked. The second session may send a request to the direct pay application. In response to receiving the request, the CCSM client contacts the CCSM manager. The CCSM manager receives KAFKA messages from the application service database and checks a status of the application user account. Since the account has been flagged, the second session is blocked. Flagging the application user account by fraud detection system can include changing a status of the application user account from "valid" to "blocked." Therefore, even though the second session was already established with the direct pay application prior to the application user account associated with the direct pay application being flagged, the second session can also be blocked before a fraudster has the opportunity to withdraw funds using the direct pay application.

Figure 1:
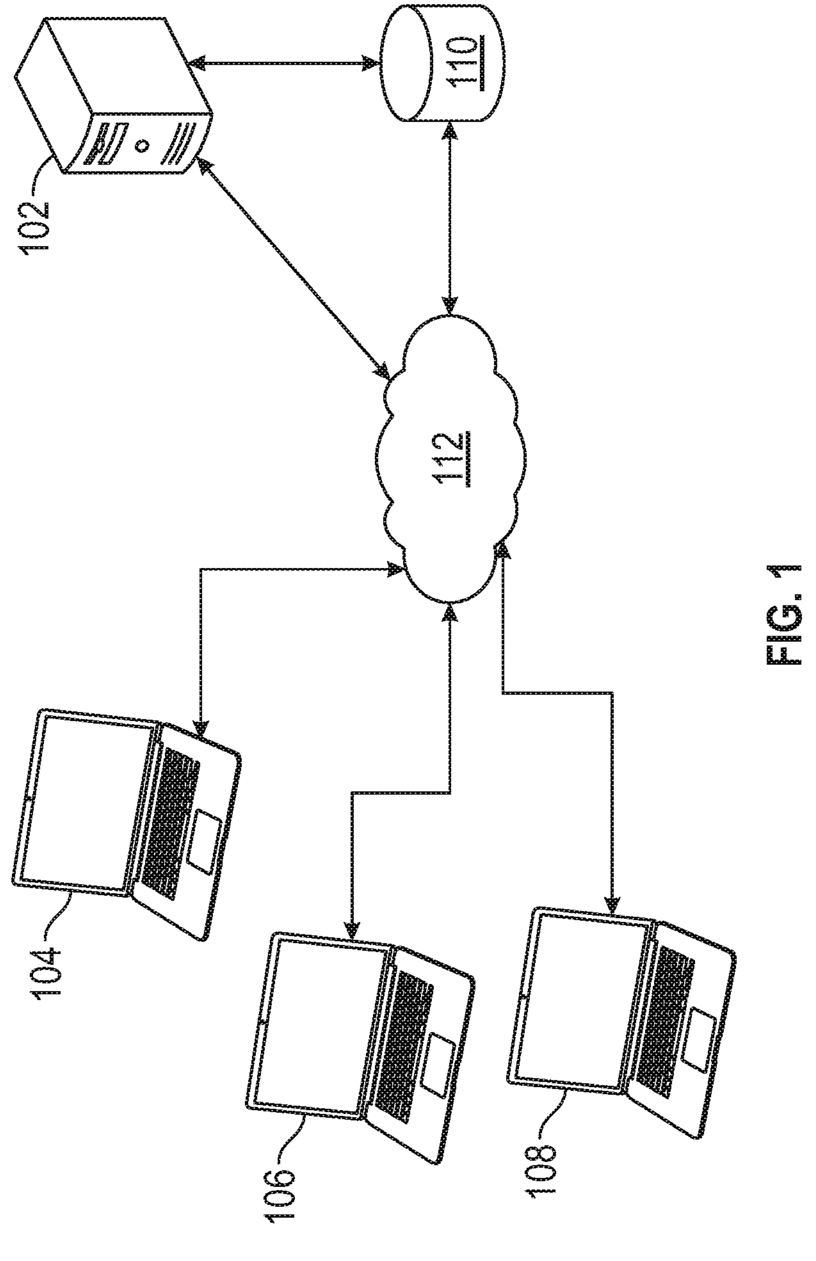
FIG. 1 shows an environment in which examples may operate, in accordance with some examples.

Now making reference to FIG. 1A, a network environment 100 is shown in which examples can operate. The network environment 100 can include a server device 102 associated with an entity, such as a financial institution, a device 104 associated with a first user, a device 106 associated with a second user, and a device 108 associated with a third user. The network environment 100 can also include a database 110 that can be internal or external to the server device 102 along with a network 112. The network 112 can facilitate communication between the server device 102, the devices 104-108, and the database 110.

The server device 102 and the devices 104-108 can incorporate an architecture that facilitates operation in the capacity of either a server or a client machine in server-client network environments, where each of these devices may be implemented as any type of computing device, such as a server computer, a personal computer (PC), or the like each having a processor configured to perform the subject matter disclosed herein. The devices 104-108 can be any computing device suitable for use by a user, such as social media users and social media followers. For example, the devices may be a desktop computer, a tablet computer, a portable media device, or a smart phone belonging to a user.

The application service accounts database 110 can be any data storage resource and may store data structured as a text file, a table, a spreadsheet, a relational database (e.g., an object-relational database), a triple store, a hierarchical data store, or any suitable combination thereof. Moreover, the server device 102 and the database 110 can be combined into a single machine, database, or device, and the functions described herein for any single machine, database, or device may be subdivided among multiple machines, databases, or devices.

The network 112 can be any network that enables communication between or among machines, databases, and devices (e.g., the server device 102, the device 104-108, and the database 110). Accordingly, the network 112 can be a wired network, a wireless network (e.g., a mobile or cellular network), or any suitable combination thereof. The network 112 may include one or more portions that constitute a private network, a public network (e.g., the Internet), or any suitable combination thereof. Accordingly, the network 112 can include one or more portions that incorporate a local area network (LAN), a wide area network (WAN), the Internet, a mobile telephone network (e.g., a cellular network), a wired telephone network (e.g., a plain old telephone system (POTS) network), a wireless data network (e.g., WiFi network or WiMax network), or any suitable combination thereof. Any one or more portions of the network 112 can communicate information via a transmission medium. As used herein, "transmission medium" shall be taken to include any intangible medium that is capable of storing, encoding, or carrying instructions for execution by a machine, and includes digital or analog communication signals or other intangible media to facilitate communication of such software.

Figure 2A:
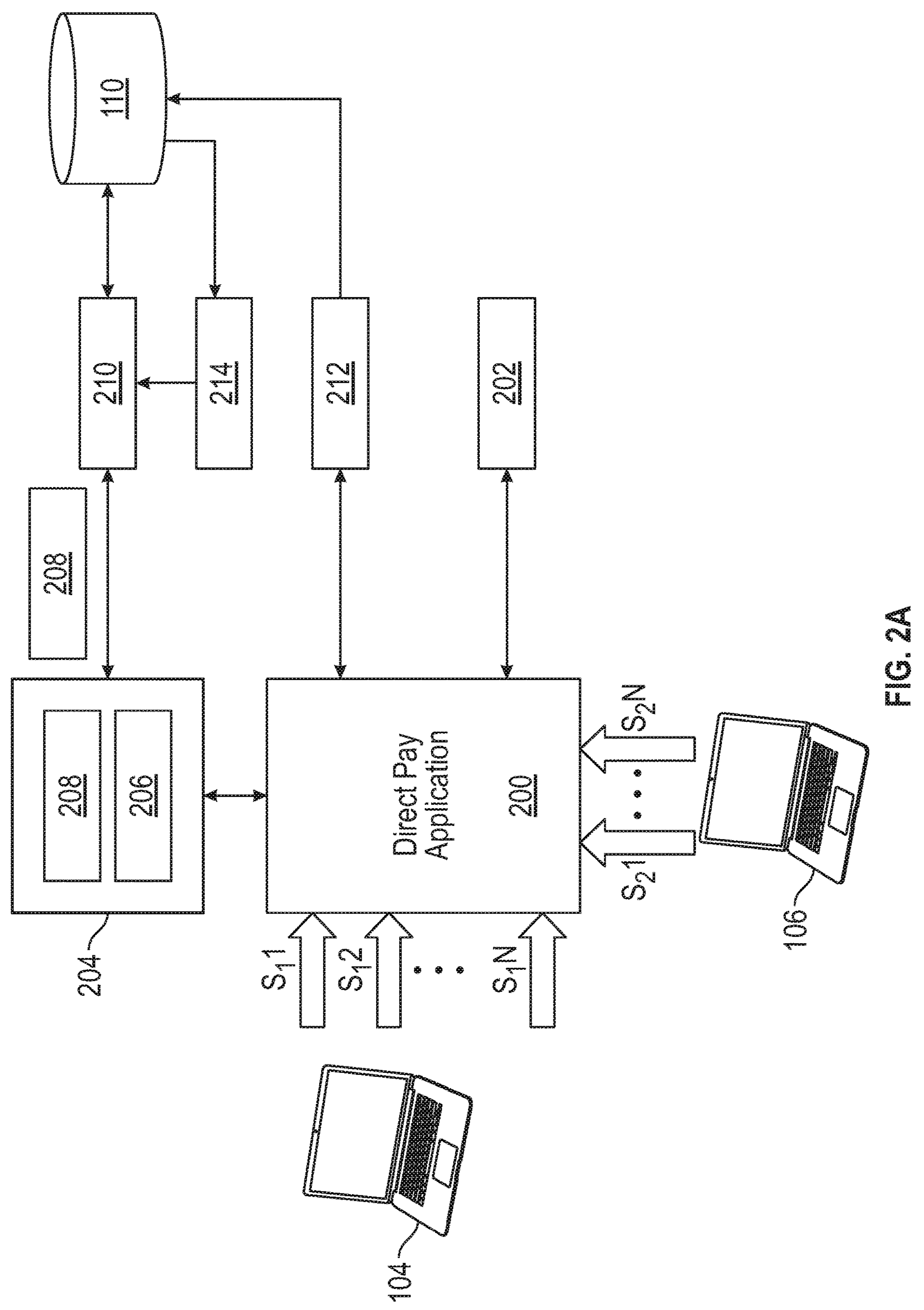
FIG. 2A illustrates an environment where different users have each established multiple, simultaneous sessions with direct pay application, in accordance with some examples.
Figure 2B:
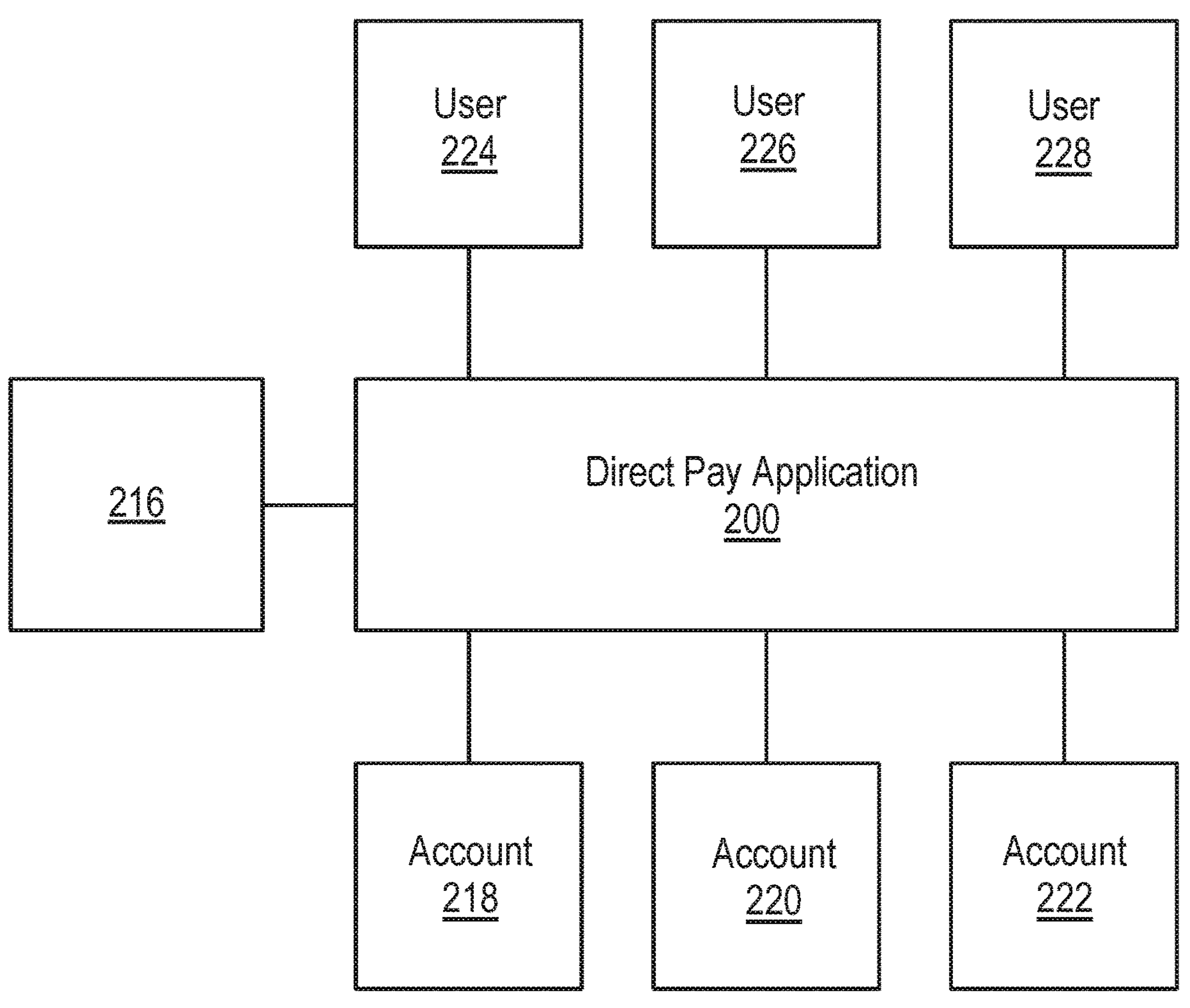
FIG. 2B shows small business customer of direct pay application, application service account, users of that application and their application user accounts and customer bank account(s).

The server device 102 can provide a direct pay application 200 (FIGS. 2A and 2B) that can provide services for a customer 216 associated with a small business application service account, which is associated with small business a bank account(s) 202. The bank account(s) 202 can include a single account, such as the bank account 202, or accounts 218-222. The bank account 202 can be a monetary checking or other bank account(s) where the direct pay business customer—, such as a business entity, makes fiscal deposits. Moreover, each of the accounts 218-222 can also be a monetary checking or other bank account(s) where the direct pay business customer makes fiscal deposits. In addition to the customer 216, other users 224-228 can be agents or proxies for the customer 216 and make withdrawals from the accounts 218-222 or deposits into the accounts 218-222 via the direct pay application 200, as described below.

The direct pay application 200 can be used to transfer funds from the bank account(s) 202 to an bank account associated with a third party (consumer or business). For example, the direct pay application 200 can be used to pay employees of the business entity or to remit payment to a third-party vendor for services rendered by the third-party vendor. Payments can be deposited directly into accounts associated with the employees and the third-party vendors.

An application webpage 204, which can be administered by the server device 102, can provide the direct pay application 200 when the devices 104-108 make session requests to the application webpage 204 to establish a session with the direct pay application 200. The application webpage 204 can include a CCSM client 206. The CCSM client 206 can be activated when a request is made to the direct pay application 200. The CCSM client 206 can access a client identification (ClientID) 208 and make a call to a CCSM manager 210 where the CCSM client 206 provides the ClientID 208 to the CCSM manager 210 during the call. The CCSM manager 210 can access KAFKA messages 214 from the application service accounts database 110 using the ClientID 208 to check a status of the application service account.

A fraudster may have attempted to fraudulently access the bank account 202. When any user (including fraudster) makes, in the direct pay application 200, sensitive actions such as creating a new payee, modifying an existing payee, creating a new payment, or modifying an existing payment, then the direct pay application 200 make a call to the fraud detection system 212. If the fraud detection system 212 identifies suspicious activity like adding a payee having a bank account number that was used in previously identified fraud attempts, then the fraud detection system 212 changes current application user account status in the application service accounts database 110 as locked due to fraud.

As shown in FIG. 2, each of the devices 104-108, such as the devices 104 and 106, can establish sessions $S_1$1-$S_1$N and $S_2$1-$S_2$N with the direct pay application 200. Therefore, each of the devices 104-108, such as the devices 104 and 106, can maintain a plurality of sessions $S_1$1-$S_1$N and $S_2$1-$S_2$N with the direct pay application 200 in parallel. The sessions $S_1$1-$S_1$N and $S_2$1-$S_2$N can be opened simultaneously or very close in time, i.e., within a few minutes of each other, where when a user at the device 104 is accessing the direct pay application with the session $S_1$1, the sessions $S_1$2-$S_1$N and $S_2$1-$S_2$N can be open. Moreover, if the session $S_1$1 is blocked, the sessions $S_1$2-$S_1$N and $S_2$1-$S_2$N remain open and allow access to the direct pay application 200 until, as will be detailed further on, they are also blocked when a request is sent using the sessions $S_1$2-$S_1$N and $S_2$1-$S_2$N.

As used herein, a session can refer to maintaining a user specific state between one, or all, of the devices 104-108 and the direct pay application 200 via the application page 204 administered by the server device 102. The user specific state can include persistent objects and authenticated user identities, in addition to other interactions between one or all of the devices 104-108 and the direct pay application 200 via the server device 102. Two-factor authorization can be used to create a session. The session can be initiated when one or all of the devices 104-108 provides a request to the application webpage 204. Credentials can be provided that include a username and a password and any other information necessary to establish the session. During establishment of a session, after the credentials have been provided by an entity, such as users associated with the devices 104-108, the application webpage 204 can message the entity, such as through email or a short-messaging-service, with a one-time password, which can be used by the entity to complete the establishment of the session.

Figure 3:
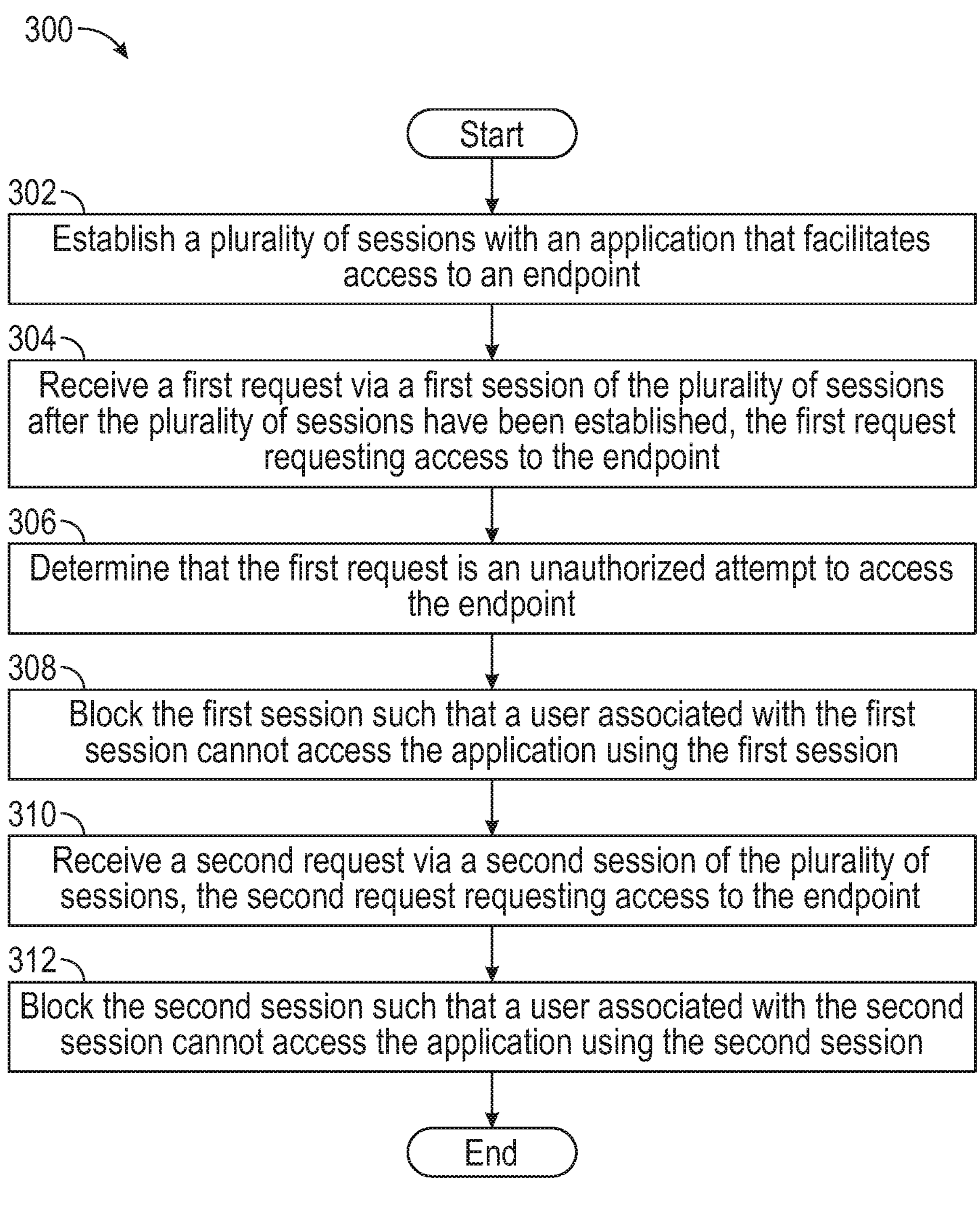
FIG. 3 shows a method of blocking access to the bank account(s) at which fraudulent activity has occurred via sessions established prior to detection of the fraudulent activity, in accordance with some examples.

As noted above, examples relate to a system and method that can prevent a fraudster from withdrawing funds from a bank account(s) that has been subject to fraudulent activity using a session established with the application prior to the fraudulent activity occurring at the bank account. Now making reference to FIG. 3, a method 300 for blocking sessions with an application that has been subject to a fraudulent activity is disclosed.

In an operation 302, a plurality of sessions is established with an application that facilitates access to an endpoint, which can be a user account. A single user or more than one user can be associated with the plurality of sessions. The endpoint can be an bank account(s) holding monetary funds. The application can facilitate transactions with the endpoint, such as transferring funds from the bank account(s) to a user account. Each session of the plurality sessions can be established as discussed above with reference to the sessions $S_1$1-$S_1$N and $S_2$1-$S_2$N.

After the plurality of sessions is established during the operation 302, the method 300 performs an operation 304, where a first request is received via a first session of the plurality of sessions. The first request can relate to accessing the endpoint. More specifically, the first request can relate to withdrawing funds from the endpoint and depositing the funds into an account associated with an entity requesting the access to the endpoint. In response to receiving the first request, the method 300 performs an operation 306, where a determination is made that the first request is an unauthorized attempt to access the endpoint. In particular, a fraud detection system can determine if the activity request is fraudulent, as previously discussed.

As an illustration of the method 300 and referred to herein as "the example," during the operation 302, the sessions $S_1$1-$S_1$N and $S_2$1-$S_2$N can be established as shown in FIG. 2. In the example, multiple users, such as users associated with the user devices 104 and 106, can establish the plurality of sessions $S_1$1-$S_1$N and $S_2$1-$S_2$N as detailed above. The plurality of sessions $S_1$1-$S_1$N and $S_2$1-$S_2$N can be established close in time to each other and before a request is sent to the direct pay application 200 from one of the users associated with the user devices 104 and 106. The plurality of sessions $S_1$1-$S_1$N are established with a user associated with the user device 104 and are in parallel with each other. Additionally, the plurality of sessions $S_2$1-$S_2$N are established with a user associated with the user device 106 different from the user associated with the user device 104 and are in parallel with each other.

Still sticking with the example, during the operation 304, the user associated with the user device 104 sends a first request via the first session $S_1$1 after the sessions $S_1$1-$S_1$N and $S_2$1-$S_2$N have been established. The first request is sent to the direct pay application 200 and relates to withdrawing funds from the bank account(s) 202. In the example, the user associated with the user device 104 is a fraudster and is not authorized to access the bank account(s) 202 nor withdraw funds from the bank account(s) 202. During the operation 306, the fraud detection system 212 determines that the first request is an unauthorized attempt to access the bank account(s) 202 and withdraw funds from the bank account(s) 202.

Returning attention to FIG. 3 and the method 300, after a determination is made that the first request is an unauthorized attempt to access the endpoint, the method 300 performs an operation 308 where the first session is blocked. Therefore, the user associated with the first session cannot access the application using the first session.

Moreover, an application (user) account that the application is used to access can be flagged. Initially, the application user account can have a flag that indicates that the service account can be accessed, such as the flag "valid." When a determination is made that an unauthorized access attempt has occurred in the session, which can be initiated by application user account, the flag can be set such that access is no longer allowed, such as changing the flag from "valid" to "blocked." When further attempts are made to access the application, such as with other sessions that were previously established with the application prior to the fraud attempt being identified and the application user account flag being set to "blocked," not only will access be denied to the application user account, the other sessions previously established with the application with that application user account will be blocked.

Returning attention to the example and FIG. 2, during the operation 308, the server device 102 blocks the first session $S_1$1 with the direct pay application 200. Moreover, the fraud detection system 212 can update a status of the application user account at the application accounts database 110 such that a flag associated with the application user account at the database 110 is changed from "valid" to "blocked."

Returning to FIG. 3 and the method 300, once the first session is blocked during the operation 308, the method 300 performs an operation 310 where a second request is received via a second session of the plurality of sessions. The second request can relate to accessing the endpoint. More specifically, the second request can be a transactional request such as a request to withdraw funds from the endpoint, a generic request to access the endpoint, such as simply checking a balance of a bank account when the endpoint is an account, a session refresh request, or any other type of request sent pertaining to the endpoint. When the second session request is received, the CCSM client 206 sends the ClientID 208 to the CCSM manager 210. The CCSM manager 210 receives messages from application service accounts from database 110 to determine a state of the endpoint. Here, the state can refer to what type of flag is associated with the endpoint. If flag is set to "blocked," then, during an operation 312, the method 300 blocks the second session such that a user associated with the second session cannot access the application using the second session. In addition, the second request can be sent from the user who sent the first request. Alternatively, the second request can be sent from another user that is different from the user who sent the first request.

Referring back to the example and FIG. 2, during the operation 310, a second request to access the application is received via the second session $S_1$2. Since the application user account was flagged as "blocked" during the operation 308, the server device 102 blocks the second session $S_1$2 such that the user associated with the user device 104 cannot access the direct pay application 200 and the service account during the second session $S_1$2. As a result, a fraudster cannot access the bank account(s) 202.

The operations 310 and 312 can be repeated for any number of sessions established with a direct pay application that is associated with an endpoint where the sessions were established before fraudulent activity was detected at the endpoint. If a fraudster has multiple sessions opened with the direct pay application 200 prior to engaging in fraudulent activity, such as the sessions $S_1$2-$S_1$N that were already established, the fraudster is prevented from engaging in fraudulent activity using the direct pay application 200 even though the sessions $S_1$2-$S_1$N were already established. Similarly, other fraudsters, such as the user that established the parallel sessions $S_2$1-$S_2$N, who have established sessions prior to fraudulent activity occurring, are prevented from engaging in fraudulent activity using the direct pay application 200 even though the sessions $S_2$1-$S_2$N were already established. Therefore, all sessions can be blocked.

In further examples, when a user is identified as being a fraudster, other sessions that the user has established with the direct pay application for a blocked account can be tracked. Here, the established sessions can be blocked before the user attempts to send a session request using any of the tracked sessions. Thus, all sessions can be blocked.

Moreover, while accounts being accessed by direct pay applications have been described as being financial account, examples described herein can relate to any type of the bank account(s) holding anything of value. For example, the bank account 202 could be a credit account, a saving account, a rewards account, a cryptocurrency account, a brokerage account or the like.

Figure 4:
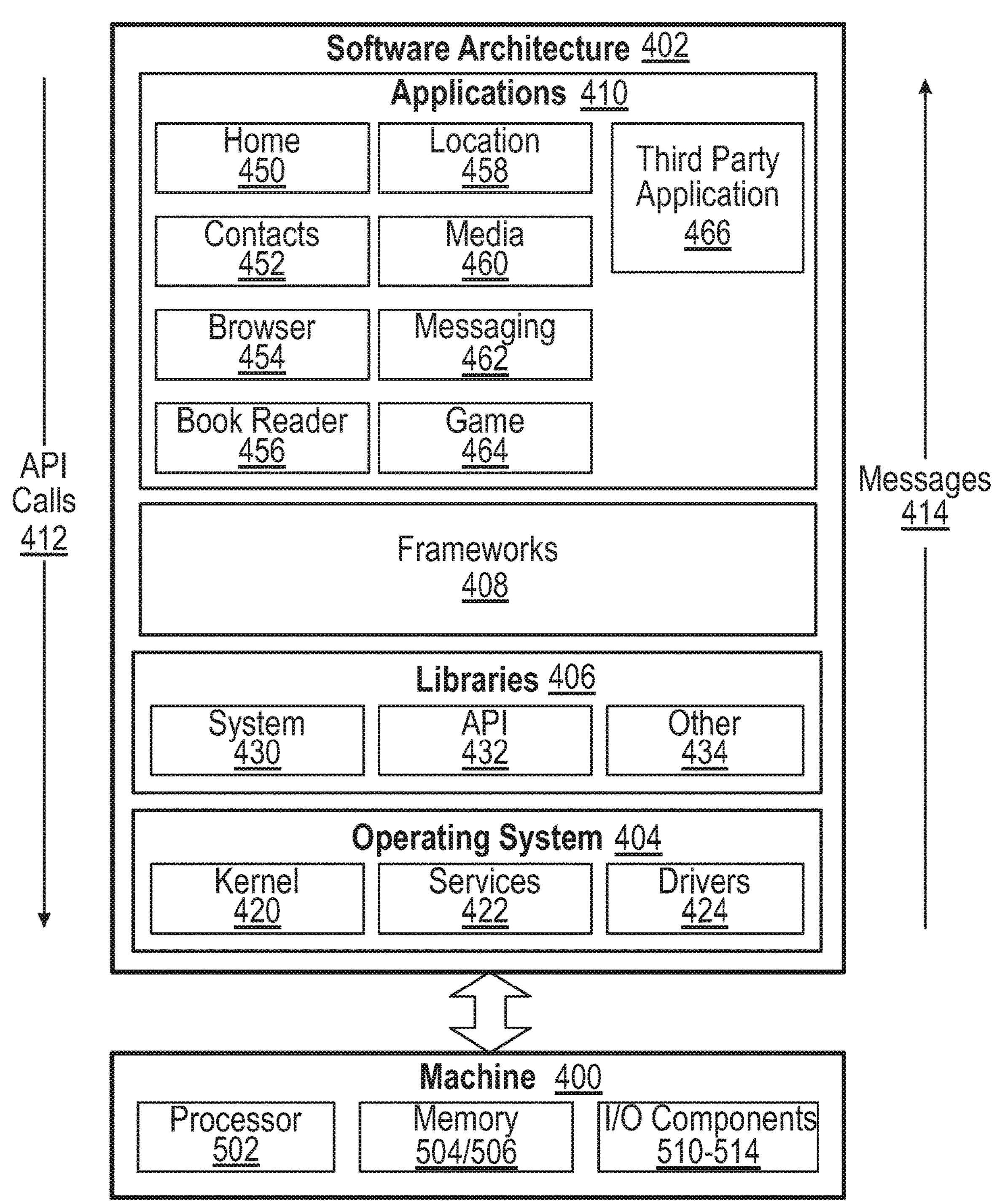
FIG. 4 is a block diagram illustrating an example of a machine upon which one or more examples may be implemented.

FIG. 4 is a block diagram 400 illustrating a software architecture 402, which may be installed on any one or more of the devices described above. FIG. 4 is merely a non-limiting example of a software architecture, and it will be appreciated that many other architectures may be implemented to facilitate the functionality described herein. The software architecture 402 may be implemented by hardware such as a computer system 500 of FIG. 5 that includes a processor 502, memory 504 and 506, and I/O components 510-514. In this example, the software architecture 402 may be conceptualized as a stack of layers where each layer may provide a particular functionality. For example, the software architecture 502 includes layers such as an operating system 404, libraries 406, frameworks 408, and applications 410. Operationally, the applications 410 invoke application programming interface (API) calls 412 through the software stack and receive messages 414 in response to the API calls 412, according to some implementations.

In various implementations, the operating system 404 manages hardware resources and provides common services. The operating system 404 includes, for example, a kernel 420, services 422, and drivers 424. The kernel 420 acts as an abstraction layer between the hardware and the other software layers in some implementations. For example, the kernel 420 provides memory management, processor management (e.g., scheduling), component management, networking, and security settings, among other functionality. The services 422 may provide other common services for the other software layers. The drivers 424 may be responsible for controlling or interfacing with the underlying hardware. For instance, the drivers 424 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth.

In some implementations, the libraries 406 provide a low-level common infrastructure that may be utilized by the applications 410. The libraries 406 may include system libraries 430 (e.g., C standard library) that may provide functions such as memory allocation functions, string manipulation functions, mathematic functions, and the like. In addition, the libraries 406 may include API libraries 432 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 406 may also include a wide variety of other libraries 434 to provide many other APIs to the applications 410.

The frameworks 408 provide a high-level common infrastructure that may be utilized by the applications 410, according to some implementations. For example, the frameworks 408 provide various graphic user interface (GUI) functions, high-level resource management, high-level location services, and so forth. The frameworks 408 may provide a broad spectrum of other APIs that may be utilized by the applications 410, some of which may be specific to a particular operating system or platform.

In an example, the applications 410 include a home application 450, a contacts application 452, a browser application 454, a book reader application 456, a location application 458, a media application 460, a messaging application 462, a game application 464, and a broad assortment of other applications such as a third-party application 466. According to some examples, the applications 410 are programs that execute functions defined in the programs. Various programming languages may be employed to create one or more of the applications 410, structured in a variety of manners, such as object-orientated programming languages (e.g., Objective-C, Java, or C++) or procedural programming languages (e.g., C or assembly language). In a specific example, the third-party application 466 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third-party application 466 may invoke the API calls 412 provided by the mobile operating system (e.g., the operating system 404) to facilitate functionality described herein.

Certain examples are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In examples, one or more computer systems (e.g., a standalone, client or server computer system) or one or more processors may be configured by software (e.g., an application or application portion) as a hardware-implemented module that operates to perform certain operations as described herein.

In various examples, a hardware-implemented module may be implemented mechanically or electronically. For example, a hardware-implemented module may include dedicated circuitry or logic that is permanently configured (e.g., as a special-purpose processor, such as a field programmable gate array (FPGA) or an application-specific integrated circuit (ASIC)) to perform certain operations. A hardware-implemented module may also include programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering examples in which hardware-implemented modules are temporarily configured (e.g., programmed), each of the hardware-implemented modules need not be configured or instantiated at any one instance in time. For example, where the hardware-implemented modules include a general-purpose processor configured using software, the general-purpose processor may be configured as respectively different hardware-implemented modules at different times. Software may, accordingly, configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiples of such hardware-implemented modules exist contemporaneously, communications may be achieved through signal transmission (e.g., over appropriate circuits and buses) that connects the hardware-implemented modules. In examples in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some examples, include processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but also deployed across a number of machines. In some examples, the processor or processors may be located in a single location (e.g., within a home environment, an office environment or as a server farm), while in other examples, the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via the network 112 (e.g., the Internet) and via one or more appropriate interfaces (e.g., application program interfaces (APIs).)

Examples may be implemented in digital electronic circuitry, or in computer hardware, firmware, software, or in combinations of them. Examples may be implemented using a computer program product, e.g., a computer program tangibly embodied in an information carrier, e.g., in a machine-readable medium for execution by, or to control the operation of data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers, at one site or distributed across multiple sites, and interconnected by a communication network.

The computing system can include clients and servers. A client and server are generally remote from each other and typically interact through a communication network. The relationship of client and server arises by virtue of computer programs running on the respective computers and having a client-server relationship to each other. In examples deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various examples.

Figure 5:
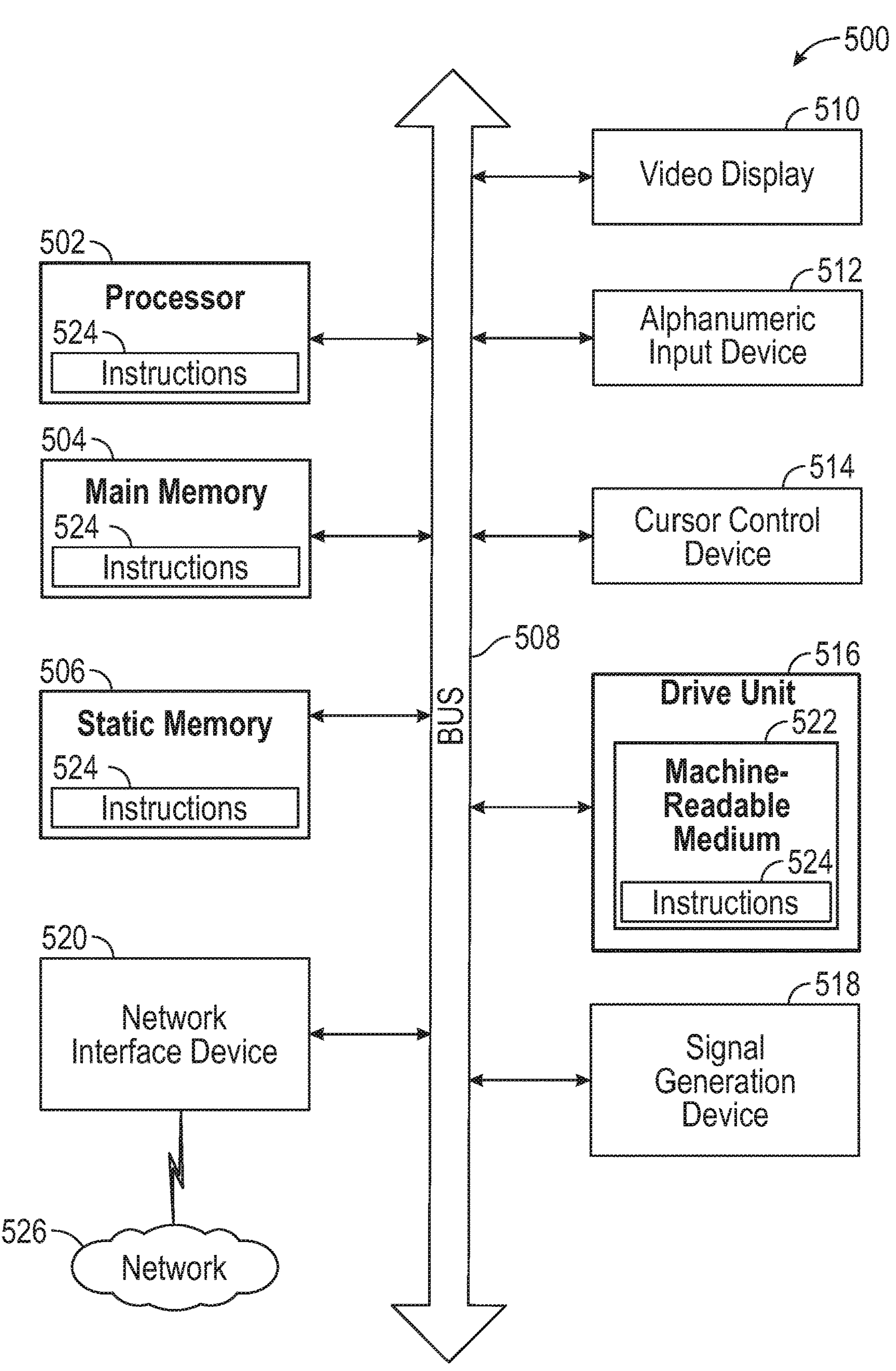
FIG. 5 illustrates a device that can be used to implement exemplary examples of the present disclosure.

FIG. 5 is a block diagram of a machine within which instructions may be executed for causing the machine to perform any one or more of the methodologies discussed herein. In one example, the machine may be any of the devices described above. In alternative examples, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that, individually or jointly, execute a set (or multiple sets) of instructions to perform any one or more of the methodologies discussed herein.

The example computer system 500 includes a processor 502 (e.g., a central processing unit (CPU), a graphics processing unit (GPU), processing circuitry, or any combination thereof), a main memory 504 and a static memory 506, which communicate with each other via a bus 508. The computer system 500 may further include a video display unit 510 (e.g., a liquid crystal display (LCD) or a cathode ray tube (CRT)). The computer system 500 also includes an alphanumeric input device 512 (e.g., a keyboard), a user interface (UI) navigation device (cursor control device) 514 (e.g., a mouse), a disk drive unit 516, a signal generation device 518 (e.g., a speaker) and a network interface device 520.

The drive unit 516 includes a machine-readable medium 522 on which is stored one or more sets of instructions and data structures (e.g., software) 524 embodying or utilized by any one or more of the methodologies or functions described herein. The instructions 524 may also reside, completely or at least partially, within the main memory 504 and/or within the processor 502 during execution thereof by the computer system 500, the main memory 504 and the processor 502 also constituting machine-readable media. The instructions 524 may also reside within the static memory 506.

While the machine-readable medium 522 is shown in an example to be a single medium, the term "machine-readable medium" may include a single medium or multiple media (e.g., a centralized or distributed database, and/or associated caches and servers) that store the one or more instructions or instructions 524. The term "machine-readable medium" shall also be taken to include any tangible medium that is capable of storing, encoding or carrying the instructions 524 for execution by the machine and that cause the machine to perform any one or more of the methodologies of the present invention, or that is capable of storing, encoding or carrying data structures utilized by or associated with such instructions 524. The term "machine-readable medium" shall accordingly be taken to include, but not be limited to, solid-state memories, and optical and magnetic media. Specific examples of machine-readable media include non-volatile memory, including by way of example, semiconductor memory devices, e.g., erasable programmable read-only memory (EPROM), electrically erasable programmable read-only memory (EEPROM), and flash memory devices; magnetic disks, such as internal hard disks and removable disks; magneto-optical disks; and CD-ROM and DVD-ROM disks.

The instructions 524 may further be transmitted or received over a communications network 526 using a transmission medium. The instructions 524 may be transmitted using the network interface device 520 and any one of a number of well-known transfer protocols (e.g., HTTP). Examples of communication networks include a local area network ("LAN"), a wide area network ("WAN"), the Internet, mobile telephone networks, plain old telephone (POTS) networks, and wireless data networks (e.g., Wi-Fi and Wi-Max networks). The term "transmission medium" shall be taken to include any intangible medium that is capable of storing, encoding or carrying instructions 524 for execution by the machine, and includes digital or analog communications signals or other intangible media to facilitate communication of such software.

In various example examples, one or more portions of the network 526 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 526 or a portion of the network 526 may include a wireless or cellular network, and a coupling may be a Code Division Multiple Access (CDMA) connection, a Global System for Mobile communications (GSM) connection, or another type of cellular or wireless coupling. In this example, a coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology. Although an example has been described with reference to specific examples, it will be evident that various modifications and changes may be made to these examples without departing from the broader spirit and scope of the invention. Accordingly, the specification and drawings are to be regarded in an illustrative rather than a restrictive sense. The accompanying drawings that form a part hereof, show by way of illustration, and not of limitation, specific examples in which the subject matter may be practiced. The examples illustrated are described in sufficient detail to enable those skilled in the art to practice the teachings disclosed herein. Other examples may be utilized and derived therefrom, such that structural and logical substitutions and changes may be made without departing from the scope of this disclosure. This Detailed Description, therefore, is not to be taken in a limiting sense, and the scope of various examples is defined only by the appended claims, along with the full range of equivalents to which such claims are entitled.

Such examples of the inventive subject matter may be referred to herein, individually and/or collectively, by the term "invention" merely for convenience and without intending to voluntarily limit the scope of this application to any single invention or inventive concept if more than one is in fact disclosed. Thus, although specific examples have been illustrated and described herein, it should be appreciated that any arrangement calculated to achieve the same purpose may be substituted for the specific examples shown. This disclosure is intended to cover any and all adaptations or variations of various examples. Combinations of the above examples, and other examples not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example.

The terms "machine-readable medium," "computer-readable medium" and "device-readable medium" mean the same thing and may be used interchangeably in this disclosure. The terms are defined to include both machine-storage media and transmission media. Thus, the terms include both storage devices/media and carrier waves/modulated data signals.

The above description is intended to be illustrative, and not restrictive. For example, the above-described examples (or one or more aspects thereof) can be used in combination with others. Other embodiments can be used, such as by one of ordinary skill in the art upon reviewing the above description. The Abstract is to allow the reader to quickly ascertain the nature of the technical disclosure, for example, to comply with 37 C.F.R. § 1.72(b) in the United States of America. It is submitted with the understanding that it will not be used to interpret or limit the scope or meaning of the claims.

Also, in the above Detailed Description, various features can be grouped together to streamline the disclosure. However, the claims cannot set forth every feature disclosed herein as embodiments can feature a subset of said features. Further, embodiments can include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A system comprising:

processing circuitry; and a memory device including instructions stored thereon, wherein the instructions, which when executed by the processing circuitry, configure the processing circuitry to perform operations that:

establish a plurality of sessions with an application, the application facilitating access to an endpoint, wherein the application is associated with an application webpage having a concurrent session management (CCSM) client and each of the plurality of sessions:

are established with a session establishment request and user credentials; and maintain a user specific state having persistent objects and user identities between a device and the endpoint, the endpoint having a status stored at an application service accounts database, the status being associated with a first value;

receive a first request via a first session of the plurality of sessions after the plurality of sessions have been established, the first request requesting access to the endpoint;

determine, by a fraud detection system, that the first request is an unauthorized attempt to access the endpoint;

in response to determining that the first request is an unauthorized attempt, apply a flag to an application user account associated with the first session at the application service accounts database to prevent further access to the endpoint;

change the status at the application service accounts database associated with the endpoint from the first value to a second value, the second value indicating that no further access to the endpoint is permitted;

block, by a CCSM manager in communication with the CCSM client, the first session thereby blocking a user associated with the first session from accessing the application using the first session when a determination is made that the first request is an unauthorized attempt to access the endpoint such that the user specific state is no longer maintained at the application service accounts database;

receive a second request via a second session of the plurality of sessions after the first session is blocked, wherein:

the second request requests access to the endpoint;

the second session is established prior to blocking the first session;

in response to receiving the second request, cause the CCSM client to contact the CCSM manager with an application user account identifier;

receive a message from the application service accounts database indicating the application user account is blocked in response to receiving the message; and determine, by the CCSM manager, that the status associated with the endpoint has the second value; and block, by the CCSM manager, the second session such that a user associated with the second session cannot access the application using the second session such that all sessions of the plurality of sessions are blocked, wherein ones of the plurality of sessions were established prior to blocking the first session.

2. The system of claim 1, wherein the processing circuitry is further configured to perform operations that:

access the application service accounts database when the second request is received via the second session; and block the second session based on the application user account being flagged.

3. The system of claim 2, wherein the application is a direct pay application associated with the application webpage and the CCSM manager receives messages from the application service accounts database when the second request is received.

4. The system of claim 1, wherein a same user is associated with the first session and the second session and the plurality of sessions are parallel sessions.

5. The system of claim 4, wherein the processing circuitry is further configured to perform operations that:

track sessions of the plurality of sessions that are associated with a same application user account; and block sessions of the plurality of sessions that are associated with the same application user account in response to determining that the first request is an unauthorized attempt to access the endpoint.

6. The system of claim 1, wherein a first user is associated with the first session and a second user different from the first user is associated with the second session.

7. The system of claim 1, wherein the endpoint is a bank account holding monetary funds.

8. The system of claim 1, wherein the user credentials include a username and a password that are exchanged and are active when the first request is received via the first session.

9. The system of claim 1, wherein the second request is one of a request to access the endpoint, a session refresh request, or a request to withdraw funds from the endpoint.

10. A non-transitory, machine-readable medium, comprising instructions, which when performed by a processor of a machine, causes the processor to perform operations to:

establish a plurality of sessions with an application, the application facilitating access to an endpoint, wherein the application is associated with an application webpage having a concurrent session management (CCSM) client and each of the plurality of sessions:

are established with a session establishment request and user credentials; and maintain a user specific state having persistent objects and user identities between a device and the endpoint, the endpoint having a status stored at an application service accounts database, the status being associated with a first value;

receive a first request via a first session of the plurality of sessions after the plurality of sessions have been established, the first request requesting access to the endpoint;

determine, by a fraud detection system, that the first request is an unauthorized attempt to access the endpoint;

in response to determining that the first request is an unauthorized attempt, apply a flag to an application user account associated with the first session at the application service accounts database to prevent further access to the endpoint;

change the status at the application service accounts database associated with the endpoint from the first value to a second value, the second value indicating that no further access to the endpoint is permitted;

block, by a CCSM manager in communication with the CCSM client, the first session thereby blocking a user associated with the first session from accessing the application using the first session when a determination is made that the first request is an unauthorized attempt to access the endpoint such that the user specific state is no longer maintained at the application service accounts database;

receive a second request via a second session of the plurality of sessions after the first session is blocked, wherein:

the second request requests access to the endpoint;

the second session is established prior to blocking the first session;

in response to receiving the second request, cause the CCSM client to contact the CCSM manager with an application user account identifier;

receive a message from the application service accounts database indicating the application user account is blocked in response to receiving the message; and determine, by the CCSM manager, that the status associated with the endpoint has the second value; and block, by the CCSM manager, the second session such that a user associated with the second session cannot access the application using the second session such that all sessions of the plurality of sessions are blocked, wherein ones of the plurality of sessions were established prior to blocking the first session.

11. The non-transitory, machine-readable medium of claim 10, wherein the instructions further cause the processor perform operations to:

access the application service accounts database when the second request is received via the second session; and block the second session based on the application user account being flagged, wherein the application is a direct pay application and the CCSM manager accesses the application service accounts database when the second request is received.

12. The non-transitory, machine-readable medium of claim 10, wherein a same user is associated with the first session and the second session and the plurality of sessions are parallel sessions and the instructions further cause the processor perform operations to:

track sessions of the plurality of sessions that are associated with a same application user account; and block sessions of the plurality of sessions that are associated with the same application user account in response to determining that the first request is an unauthorized attempt to access the endpoint.

13. The non-transitory, machine-readable medium of claim 10, wherein a first user is associated with the first session and a second user different from the first user is associated with the second session and the instructions further cause the processor perform operations to block all sessions of the plurality of sessions.

14. The non-transitory, machine-readable medium of claim 10, wherein the second request is one of a request to access the endpoint, a session refresh request, or a request to withdraw funds from the endpoint.

15. A method comprising:

establishing a plurality of sessions with an application, the application facilitating access to an endpoint, wherein the application is associated with an application webpage having a concurrent session management (CCSM) client and each of the plurality of sessions:

are established with a session establishment request and user credentials; and maintain a user specific state having persistent objects and user identities between a device and the endpoint, the endpoint having a status stored at an application service accounts database, the status being associated with a first value;

receiving a first request via a first session of the plurality of sessions after the plurality of sessions have been established, the first request requesting access to the endpoint;

determining, by a fraud detection system, that the first request is an unauthorized attempt to access the endpoint;

in response to determining that the first request is an unauthorized attempt, applying a flag to an application user account associated with the first session at the application service accounts database to prevent further access to the endpoint;

blocking, by a CCSM manager in communication with the CCSM client, the first session thereby blocking a user associated with the first session from accessing the application using the first session when a determination is made that the first request is an unauthorized attempt to access the endpoint such that the user specific state is no longer maintained at the application service accounts database;

receiving a second request via a second session of the plurality of sessions after the first session is blocked, wherein:

the second request requests access to the endpoint; and the second session is established prior to blocking the first session;

in response to receiving the second request, cause the CCSM client to contact the CCSM manager with an application user account identifier;

receive a message from the application service accounts database indicating the application user account is blocked in response to receiving the message; and determine, by the CCSM manager, that the status associated with the endpoint has the second value; and blocking, by the CCSM manager, the second session such that a user associated with the second session cannot access the application using the second session such that all sessions of the plurality of sessions are blocked, wherein ones of the plurality of sessions were established prior to blocking the first session.

16. The method of claim 15, wherein to the method further comprises:

accessing the application service accounts database when the second request is received via the second session; and blocking the second session based on the application user account being flagged, wherein the application is a direct pay application associated with an application web page, the application web page having a concurrent session management (CCSM) client that communicates with a CCSM manager where the CCSM manager accesses the application service accounts database when the second request is received, wherein the second request is one of a request to access the endpoint, a session refresh request, or a request to withdraw funds from the endpoint.

17. The method of claim 15, wherein a same user is associated with the first session and the second session and the plurality of sessions are parallel sessions and the method further comprises:

tracking sessions of the plurality of sessions that are associated with a same application user account; and blocking sessions of the plurality of sessions that are associated with the same application user account in response to determining that the first request is an unauthorized attempt to access the endpoint.

18. The method of claim 15, wherein a first user is associated with the first session and a second user different from the first user is associated with the second session and the method further comprises blocking all sessions of the plurality of sessions.

* * * * *